(12) United States Patent
Sohn

(10) Patent No.: US 8,785,025 B2
(45) Date of Patent: Jul. 22, 2014

(54) AIR-COOLED BATTERY PACK

(75) Inventor: Kwon Sohn, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 765 days.

(21) Appl. No.: 12/929,498

(22) Filed: Jan. 28, 2011

(65) Prior Publication Data
US 2012/0009456 A1    Jan. 12, 2012

Related U.S. Application Data

(60) Provisional application No. 61/344,361, filed on Jul. 6, 2010.

(51) Int. Cl.
*H01M 10/50*    (2006.01)

(52) U.S. Cl.
CPC ................................. *H01M 10/5004* (2013.01)
USPC ......................................................... 429/120

(58) Field of Classification Search
CPC ................................................ H01M 10/5004
USPC ......................................................... 429/120
See application file for complete search history.

(56) References Cited

U.S. PATENT DOCUMENTS

| | | |
|---|---|---|
| 2005/0287426 A1 | 12/2005 | Kim et al. |
| 2006/0063067 A1 | 3/2006 | Kim |
| 2007/0285051 A1 | 12/2007 | Jeon et al. |
| 2010/0092848 A1 | 4/2010 | Choi et al. |
| 2011/0318627 A1 | 12/2011 | Fujiwara et al. |
| 2012/0237806 A1 | 9/2012 | Choi et al. |

FOREIGN PATENT DOCUMENTS

| | | |
|---|---|---|
| CN | 1835275 A | 9/2006 |
| EP | 1610407 A1 | 12/2005 |
| JP | 2005-116342 A | 4/2005 |
| JP | 2006-012847 A | 1/2006 |
| JP | 2006-093144 A | 4/2006 |
| JP | 2007-299638 A | 11/2007 |
| JP | 2010-515219 A | 5/2010 |
| JP | 2010-149647 A | 7/2010 |
| KR | 10 2006-0037603 A | 5/2006 |
| KR | 10 2006-0037630 A | 5/2006 |
| WO | WO 2008/082111 A1 | 7/2008 |
| WO | WO 2010/073466 A1 | 7/2010 |

OTHER PUBLICATIONS

Chinese Office Action in CN 20110075879.2, dated Jul. 16, 2013 (Sohn).

(Continued)

*Primary Examiner* — Nicholas P D'Aniello
(74) *Attorney, Agent, or Firm* — Lee & Morse, P.C.

(57) ABSTRACT

A battery pack includes first and second battery cells, a first duct, the first duct having an inlet at a first end and an inclined surface at a second end opposite the first end, and a main body, the main body being connected to the first duct and encompassing the first and second battery cells. The inclined surface may have a first edge and a second edge opposite the first edge, the first edge being adjacent to the battery cells, the inclined surface being inclined such that the second edge is closer to the inlet than the first edge is, and a gap may be between the first and second battery cells, the gap providing a passage for a heat transfer medium to flow from the first duct between the first and second battery cells.

19 Claims, 12 Drawing Sheets

(56) References Cited

OTHER PUBLICATIONS

Japanese Office Action in JP 2011-069478, dated Nov. 6, 2012 (Sohn).

Japanese Notice of Allowance in JP 2011-069478, dated Feb. 26, 2013 (Sohn).

Korean Office Action in KR 10-2011-0012708, dated Jan. 31, 2013 (Sohn).

European Search Report in EP 10191315.0-1227, dated Feb. 16, 2011 (Sohn).

AIR-COOLED BATTERY PACK

CROSS-REFERENCE TO RELATED APPLICATION

The present application claims priority under 35 U.S.C. §119(e) to U.S. Provisional Application No. 61/344,361, filed on Jul. 6, 2010, and entitled: "Air-Cooled Battery Pack," which is incorporated herein by reference in its entirety and for all purposes.

BACKGROUND

1. Field

Embodiments relate to an air-cooled battery pack.

2. Description of the Related Art

A vehicle, e.g., a hybrid or electric vehicle, may include a power source that provides a motive power for the vehicle. A battery pack may provide electricity to the power source.

SUMMARY

An embodiment is directed to a battery pack, including first and second battery cells, a first duct, the first duct having an inlet at a first end and an inclined surface at a second end opposite the first end, and a main body, the main body being connected to the first duct and encompassing the first and second battery cells. The inclined surface may have a first edge and a second edge opposite the first edge, the first edge being adjacent to the battery cells, the inclined surface being inclined such that the second edge is closer to the inlet than the first edge is, and a gap may be between the first and second battery cells, the gap providing a passage for a heat transfer medium to flow from the first duct between the first and second battery cells.

The battery pack may further include a second duct, the second duct having an outlet, wherein the first and second battery cells are between the first duct and the second duct.

The battery pack may further include a heat sink between the first and second battery cells.

The gap may be defined by a trench in the heat sink.

The first and second battery cells may be stacked in a first direction, and the first duct may include inclined side surfaces, the inclined side surfaces each having a first edge extending in the first direction and a second edge extending in the first direction, the first edges being adjacent the battery cells, the inclined side surfaces being inclined towards each other such that the second edges are closer to each other than the first edges are.

The battery pack may further include a second duct, the second duct having an outlet. The first and second battery cells may be between the first duct and the second duct, the second duct may have a first end and a second end opposite the first end, the outlet being at the second end, and the second duct may have an inclined surface at the first end, the inclined surface of the second duct having a first edge and a second edge opposite the first edge, the first edge being adjacent to the battery cells, the inclined surface of the second duct being inclined such that the second edge is closer to the outlet than the first edge is.

The second duct may include inclined side surfaces, the inclined side surfaces of the second duct each having a first edge extending in the first direction and a second edge extending in the first direction, the first edges being adjacent the battery cells, the inclined side surfaces being inclined towards each other such that the second edges are closer to each other than the first edges are.

The first duct may extend in a horizontal direction, and the first duct may be above the second duct.

The battery pack may further include a support surface between the main body and one of the first and second ducts, the support surface supporting the first and second battery cells.

The support surface may include a hole penetrating therethrough, the hole being aligned with the gap and being configured to allow flow of the heat transfer medium from the gap to the outlet.

The first duct may include a first surface, the second edge of the inclined surface of the first duct being an edge of the first surface, the first duct may include an air guide vane extending from the first surface toward the batteries, and the air guide vane may be spaced apart from the batteries such that the heat transfer medium can flow between the batteries and the air guide vane.

The first surface may be an outer surface of the first duct.

The air guide vane may have a width less than that of the first surface.

The first duct may include a plurality of air guide vanes extending from the first surface toward the batteries.

The first and second battery cells may be included in a first set of battery cells stacked together and extending in a first direction, and the battery pack may include a second set of battery cells next to the first set, the first duct being in flow communication with each of the first and second sets of battery cells.

The battery pack may further include a second duct, the second duct having an outlet, the first and second battery cells being between the first duct and the second duct, and a support surface between the main body and one of the first and second ducts, the support surface supporting the first and second battery cells. The first duct may extend in the first direction, the first direction being horizontal, and the second duct may include inclined side surfaces, the inclined side surfaces of the second duct each having a first edge extending in the first direction and a second edge extending in the first direction, the first edges being adjacent the battery cells, the inclined side surfaces being inclined towards each other such that the second edges are closer to each other than the first edges are.

Another embodiment is directed to a vehicle, including a power source, the power source providing a motive power for the vehicle, and a battery pack configured to provide electricity to the power source, the battery pack including first and second battery cells, a first duct, the first duct having an inlet at a first end and an inclined surface at a second end opposite the first end, and a main body, the main body being connected to the first duct and encompassing the first and second battery cells. The inclined surface may have a first edge and a second edge opposite the first edge, the first edge being adjacent to the battery cells, the inclined surface being inclined such that the second edge is closer to the inlet than the first edge is, and a gap may be between the first and second battery cells, the gap providing a passage for a heat transfer medium to flow from the first duct between first and second battery cells.

The battery pack may further include a second duct, the second duct having an outlet, wherein the first and second battery cells are between the first duct and the second duct.

The battery pack may further include a heat sink between the first and second battery cells.

The gap may be defined by a trench in the heat sink.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

Figure 1A:
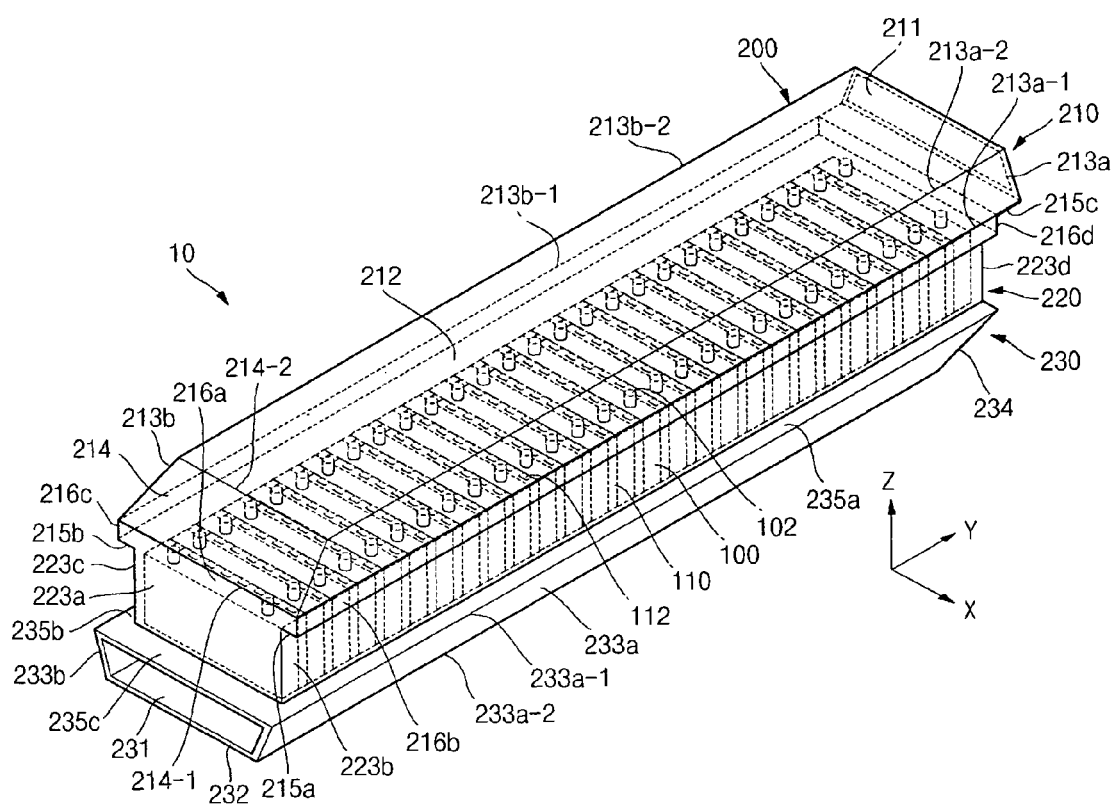
FIGS. 1a through 1e respectively illustrate perspective, Y-Z sectional, X-Z sectional, X-Y plan, and X-Y bottom views of an air-cooled battery pack according to a first example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers or elements may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIGS. 1a through 1e respectively illustrate perspective, Y-Z sectional, X-Z sectional, X-Y plan, and X-Y bottom views of an air-cooled battery pack 10 according to a first example embodiment.

The air-cooled battery pack 10 according to the first embodiment may include a plurality of battery cells 100 and a housing 200. The housing 200 may include a first duct 210, a main body 220, and a second duct 230. The housing 200 may be formed of, e.g., a general plastic, metal, ceramic, etc.

The battery cells 100 may be, e.g., general lithium-ion battery cells, lithium polymer battery cells, etc. The battery cells 100 may be horizontally stacked in a line, e.g., parallel to the Y-axis in FIG. 1a. In an implementation, the plurality of battery cells 100 may be horizontally stacked in plural lines. The battery cells may include terminals 102.

Figure 1B:
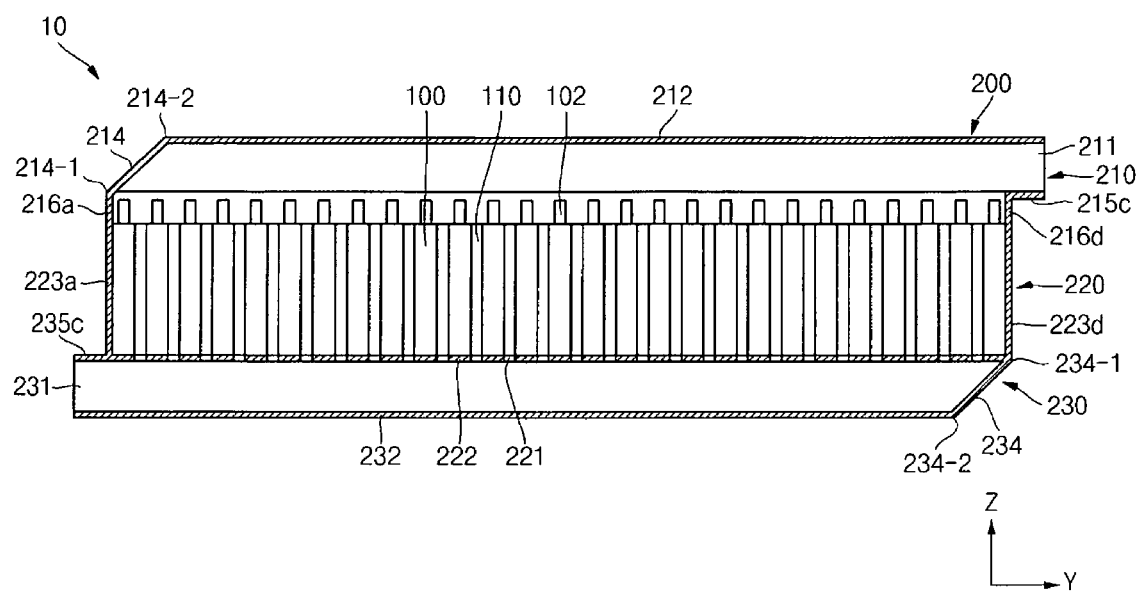
Figure 1C:
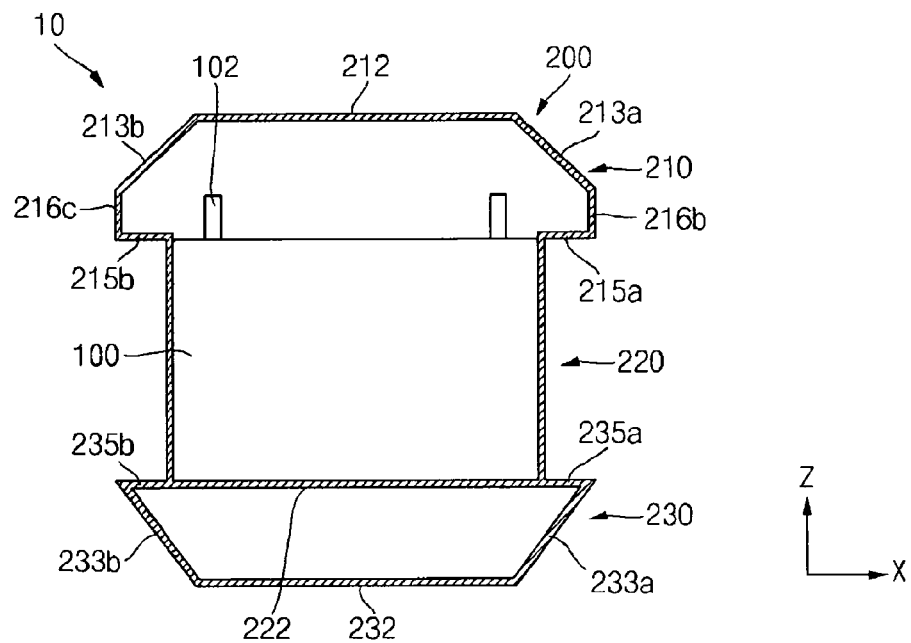
Figure 1D:
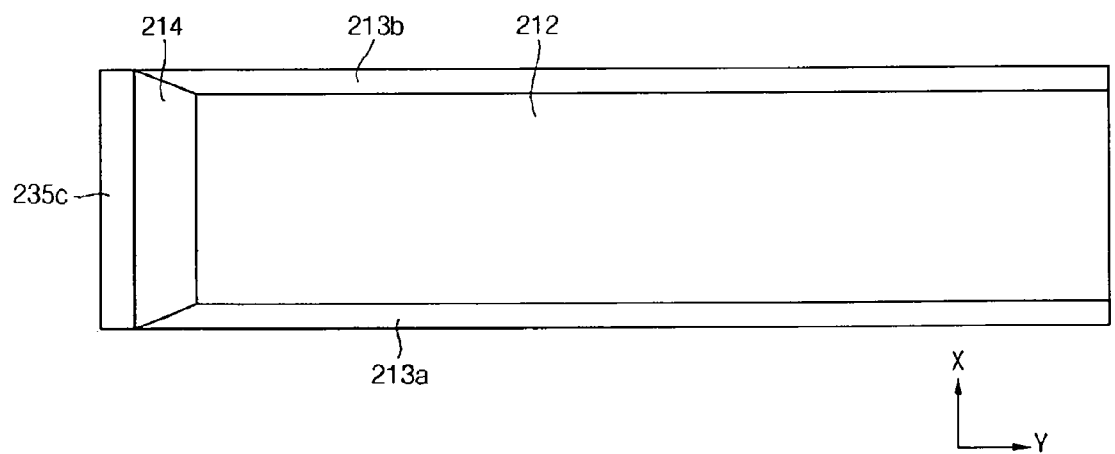
Figure 1E:
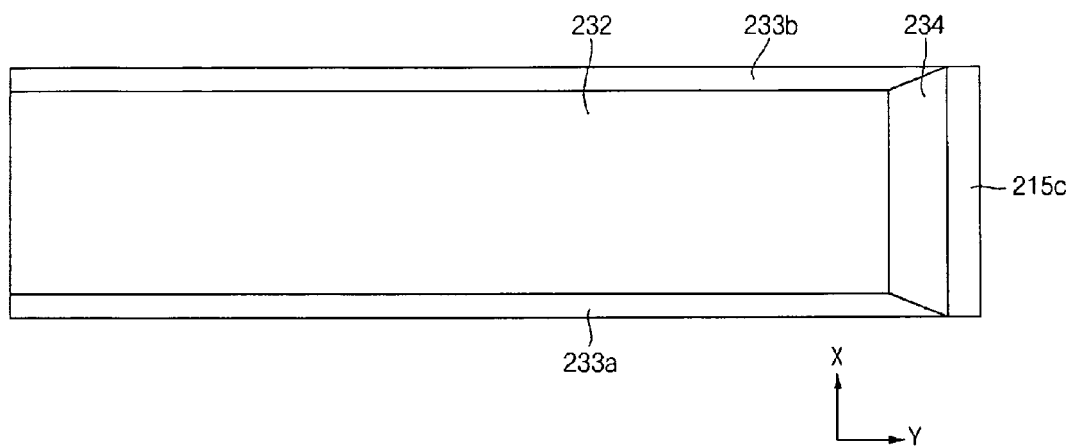

As shown in FIG. 1b, a space through which air passes may be defined between a battery cell 100 and an adjacent battery cell 100. A heatsink 110 may be disposed between the battery cell 100 and the adjacent battery cell 100. A trench 112 (see FIG. 2) may be vertically defined in the heatsink 110. The trench 112 may provide a flow path between the battery cell 100 and the adjacent battery cell 100 such that air may pass through the trench 112.

The housing 200 may surround the plurality of battery cells 100 to protect the battery cells 100 from the external environment. An airflow path may be defined in the housing 200 to effect cooling of the battery cells 100.

As described above, the housing 200 may include the first duct 210, the main body 220, and the second duct 230. The first duct 210 may be disposed above the battery cell 100.

The first duct 210 may include an inlet 211 through which air is introduced. The first duct 210 may include a top surface 212, inclined surfaces 213a and 213b disposed on both sides of the top surface 212, and a first chamfer 214 defined in a position opposite to that of the inlet 211. The inclined side surfaces 213a, 213b may each have a first edge, 213a-1 and 213b-1 respectively, extending in a first direction (e.g., parallel to the Y-axis) and a second edge, 213a-2 and 213b-2 respectively, extending in the first direction. The first edges 213a-1, 213b-1 may be adjacent to the battery cells 100. The inclined side surfaces 213a, 213b may be inclined towards each other such that the second edges 213a-2, 213b-2 of the inclined side surfaces 213a, 213b are closer to each other than the first edges 213a-1, 213b-1 are. Four side surfaces 216a, 216b, 216c, and 216d may be disposed below the inlet 211, the inclined surfaces 213a and 213b, and the first chamfer 214, respectively. Two connection surfaces 215a and 215b may be disposed below the two side surfaces 216b and 216c, respectively. The two connection surfaces 215a and 215b may be connected to the main body 220. The four side surfaces 216a, 216b, 216c, and 216d may open in a vertical direction. The first chamfer 214 may have a first edge 214-1 and a second edge 214-2 opposite the first edge 214-1. The first edge 214-1 may be adjacent to the battery cells 100, and the first chamfer 214 may be inclined such that the second edge 214-2 is closer to the inlet 211 than the first edge 214-1 is. A connection surface 215c may be disposed below the inlet 211 and may be connected to the side surface 216d.

Air introduced through the first duct 210 may be supplied to the battery cells 100 below by way of a path defined by the top surface 212, the inclined surfaces 213a and 213b, the first chamfer 214, and the four side surfaces 216a, 216b, 216c, and 216d. The first chamfer 214 and the inclined surfaces 213a and 213b may prevent an air vortex from occurring.

The main body 220 may be disposed below the first duct 210. The main body 220 may include a lower support surface 222 supporting lower portions of the plurality of battery cells 100. In another implementation, the second duct 230 may include the lower support surface 222 supporting lower portions of the plurality of battery cells 100. The main body 220 may include four side support surfaces 223a, 223b, 223c, and 223d supporting side portions of the battery cells 100. Respective through-holes 221 penetrating the lower support surface 222 may be defined at positions corresponding to a space between the battery cells 100, to allow a cooling medium, e.g., air, supplied from the first duct 210, to flow into the second duct 230 through the through-holes 221.

The second duct 230 may be disposed below the main body 220. The second duct 230 may include an outlet 231 through which air is exhausted.

The second duct 230 may include a bottom surface 232, inclined surfaces 233a and 233b disposed on both sides of the bottom surface 232, and a second chamfer 234 opposite to the outlet 231. The inclined side surfaces 233a, 233b may each have a first edge, 233a-1 and 233b-1 respectively, extending in a first direction (e.g., parallel to the Y-axis) and a second edge, 233a-2 and 233b-2 respectively, extending in the first direction. The first edges 233a-1, 233b-1 may be adjacent to the battery cells 100. The inclined side surfaces 233a, 233b may be inclined towards each other such that the second edges 233a-2, 233b-2 of the inclined side surfaces 233a, 233b are closer to each other than the first edges 233a-1, 233b-1 are. Three connection surfaces 235a, 235b, and 235c may be disposed above the inclined surfaces 233a and 233b and the outlet 231. The three connection surfaces 235a, 235b, and 235c may be connected to the main body 220. The second chamfer 234 may have a first edge 234-1 and a second edge 234-2 opposite the first edge. The first edge 234-1 may be adjacent to the battery cells 100, and the second chamfer 234 may be inclined such that the second edge 234-2 is closer to the outlet 231 than the first edge 234-1 is.

Air exhausted from the through-holes 221 of the main body 220 may be exhausted through the outlet 231 via a path defined by the bottom surface 232, the inclined surfaces 233a and 233b, and the second chamfer 234. The second chamfer 234 and the inclined surfaces 233a and 233b may prevent an air vortex from occurring.

Figure 2:
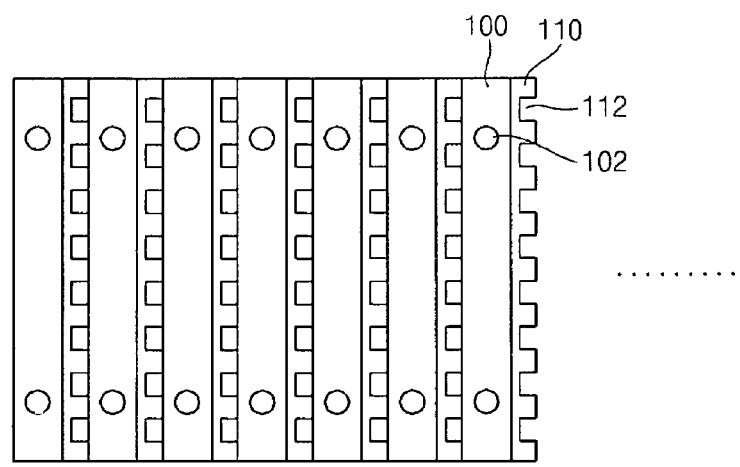
FIG. 2 illustrates a plan view of a relation between a battery cell and a heatsink having a trench in an air-cooled battery pack according to the first example embodiment.

FIG. 2 illustrates a plan view of a relation between the battery cell 100 and the heatsink 110 having a trench in an air-cooled battery pack according to the first example embodiment.

Referring to FIG. 2, the heatsink 110 may be disposed between the battery cell 100 and the adjacent battery cell 100. A plurality of trenches 112 may be defined in the heatsink 110, and air may flow from the first duct 210 to the second duct 230 through the trenches 112. Thus, air supplied from the first duct 210 may easily flow into the second duct 230 through the trenches 112 of the heatsink 110. Heat generated from the battery cells 100 may be removed by the air flowing through the trenches 112.

The heatsink 110 may be formed of, e.g., aluminum, which has good thermal dissipation performance, or another material. The through-holes 221 may be defined in the lower support surface 222 of the main body 220 corresponding to the heatsinks 110. Thus, air may flows from the first duct 210 to the second duct 230 through the through-holes 221.

Figure 3:
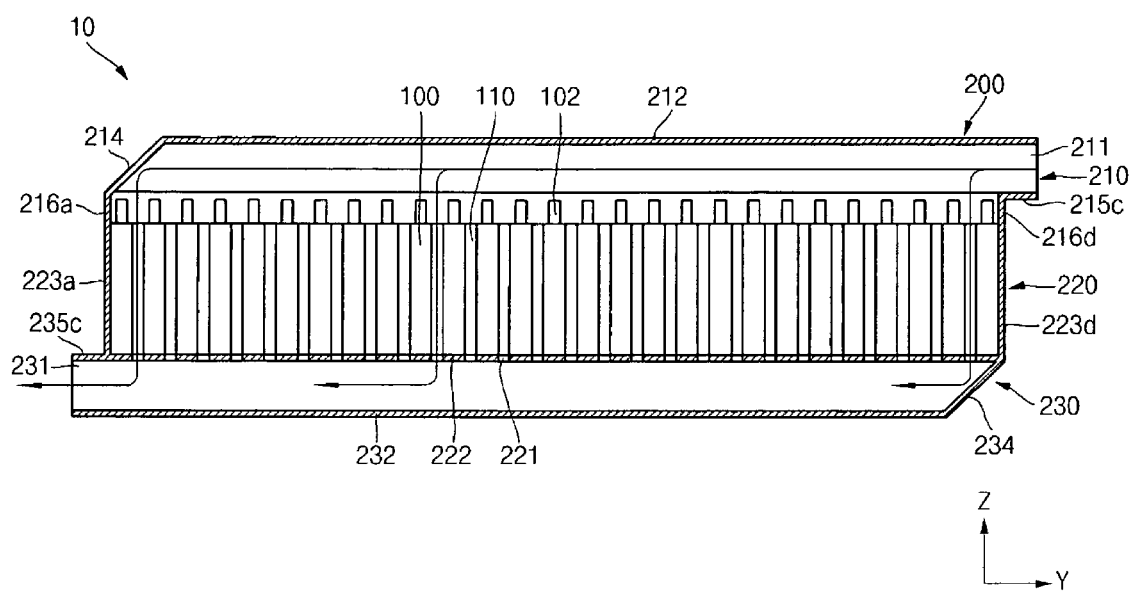
FIG. 3 illustrates an airflow diagram of a battery pack according to the first example embodiment.

FIG. 3 illustrates an airflow diagram of the battery pack 10 according to the first example embodiment.

Referring to FIG. 3, air may be introduced through the inlet 211 of the first duct 210. Then, the air may be supplied to the battery cells 100 below. Thus, the battery cells 100 may be cooled.

An airflow direction may be significantly changed by the first chamfer 214 defined in an end of the first duct 210. The first chamfer 214 may be oriented at an obtuse angle relative to the top surface 212, rather than a right angle. Thus, an air vortex may not occur. The side surface 216a may be oriented at an obtuse angle relative to the first chamfer 214. Thus, an air vortex may not occur. Thus, an air vortex may not occur by the first chamfer 214 and the side surface 216a adjacent to the first chamfer 214. The inclined surfaces 213a and 213b may be oriented at an obtuse angle relative to the top surface 212. Thus, the air vortex may not occur by the inclined surfaces 213a and 213b. The side surfaces 216b and 216c may be oriented at an obtuse angle relative to the inclined surfaces 213a and 213b. Thus, the air vortex may not occur.

The air supplied from the first duct 210 may be completely exhausted into the second duct through the space between the battery cell 100 and the adjacent battery cell 100, or the trenches 112 defined in the heatsink 110. Thus, the air may be completely exhausted to the outside through the outlet 231 of the second duct 230.

An airflow direction may be significantly changed by the second chamfer 234 defined in the second duct 230. As described above, the second chamfer 234 may be oriented at an obtuse angle relative to the side surface 223d of the main body 220 or the bottom surface 232 of the second duct 230. Thus, the air vortex may not occur. Also, the inclined surfaces 233a and 233b disposed on the second duct 230 may be oriented at an obtuse angle relative to the main body 220 or the bottom surface 232 of the second duct 230. Thus, the air vortex may not occur.

In the battery pack 10 according to the first example embodiment, the air vortex may not occur in a specific region of the housing 200. Thus, the air may flow at a relatively uniform speed and pressure within the housing 200. Accordingly, a temperature variation between the battery cells 100 may be reduced. Thus, a battery cell 100 adjacent to the inlet 211 of the battery pack 10 may have a temperature similar to that of a battery cell 100 adjacent to the outlet 231 of the battery pack 10.

FIGS. 4a through 4d illustrate perspective, Y-Z sectional, X-Z sectional, and X-Y plan views of an air-cooled battery pack 20 according to a second example embodiment. Descriptions of the same structure as that of the above-described embodiment may be omitted in order to avoid repetition.

Referring to FIGS. 4a through 4d, the battery pack 20 according to the second example embodiment may further include an air guide vane 217 on the housing 200. In an implementation, the air guide vane 217 may be disposed on the first duct 210.

The air guide vane 217 may protrude downward from the top surface 212 of the first duct 210. In an implementation, the air guide vane 217 may have four side surfaces 217a extending downward by a certain length from the top surface 212 of the first duct 210, and may have a bottom surface 217b connected to the four side surfaces 217a. The air guide vane 217 may be integrated with the first duct 210. In another implementation, the air guide vane 217 may be attached to the top surface 212 of the separately prepared first duct 210. The air guide vane 217 is illustrated as having a rectangular shape in plan or section. In other implementations, the air guide vane 217 may have various shapes such as a triangular shape, semicircular shape, a half oval shape, etc.

The air guide vane 217 may have a width less than that of the top surface 212 of the first duct 210 in an X-axis direction. The first duct 210 may extend in a horizontal direction, e.g., parallel to the Y-axis in the X-Y plane, and a portion of the air introduced into the first duct 210 may be directed to a lower side from the air guide vane 217, and the other portion of the air may straightly flow through a space between the air guide vane 217 and the inclined surfaces 213a and 213b. Also, the air guide vane 217 may have a thickness less than heights of the inclined surfaces 213a and 213b in a Z-axis direction. Thus, air introduced into the first duct 210 may continuously flow in a horizontal direction.

Figure 4A:
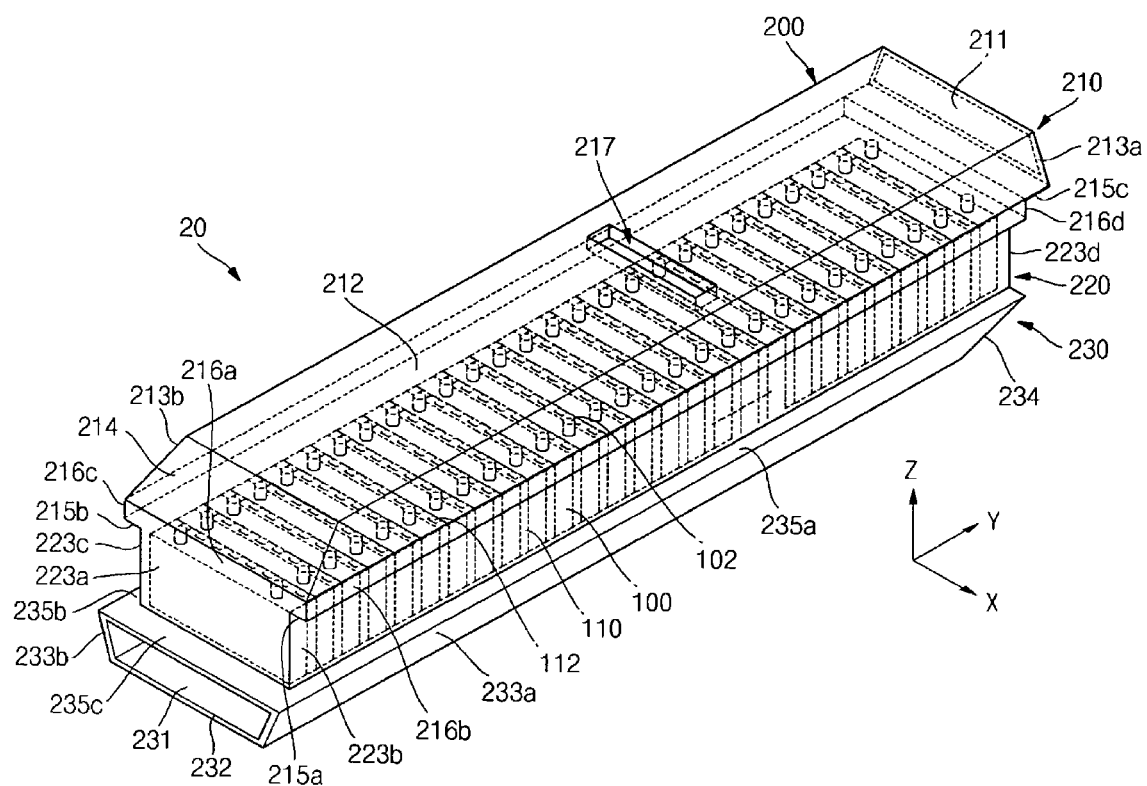
FIGS. 4a through 4d illustrate perspective, Y-Z sectional, X-Z sectional, and X-Y plan views of an air-cooled battery pack according to a second example embodiment.
Figure 4B:
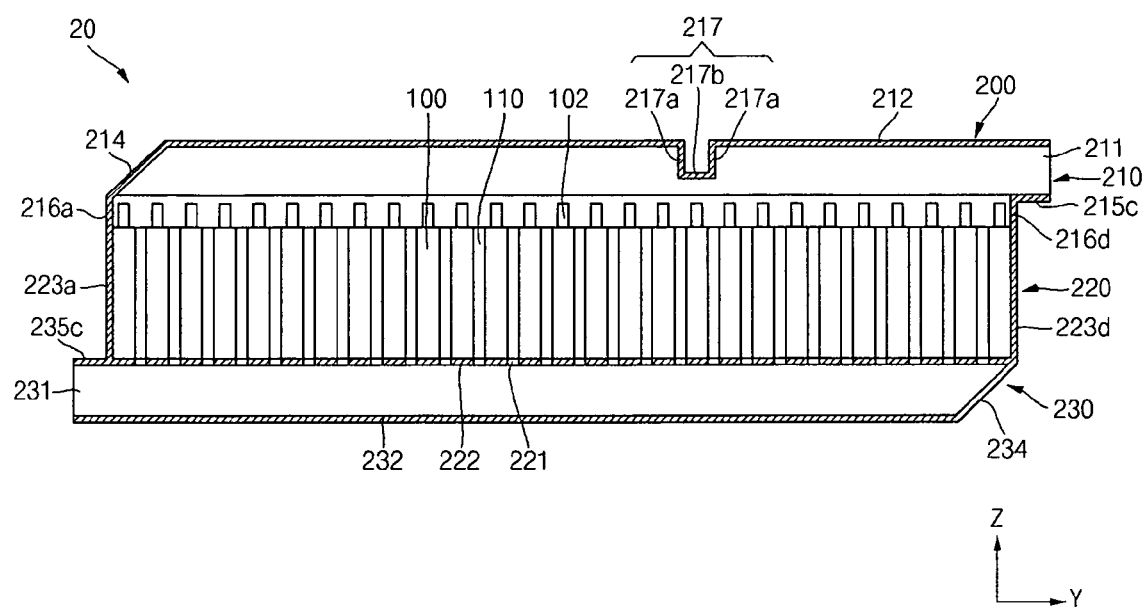
Figure 4C:
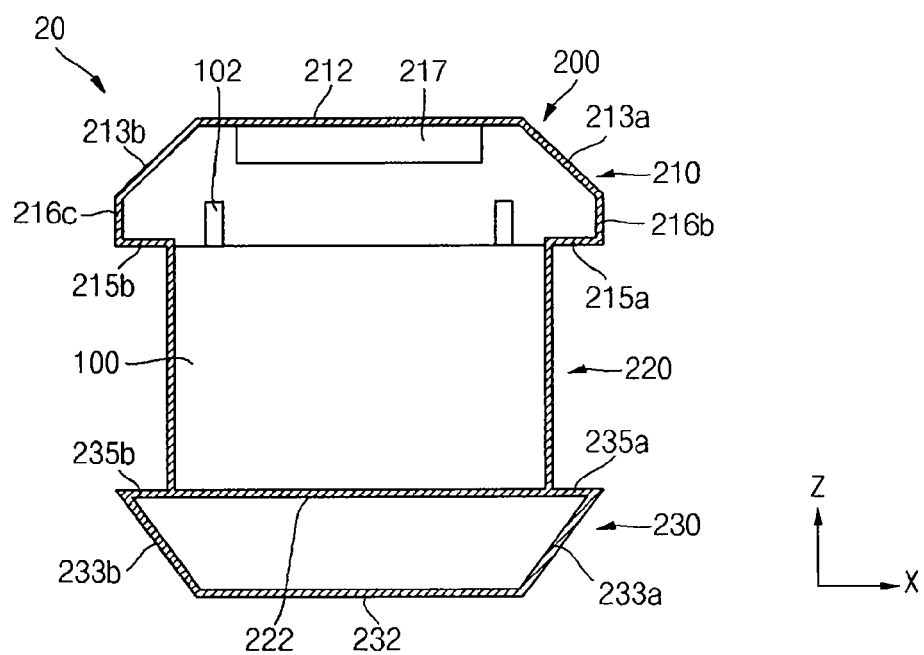
Figure 4D:
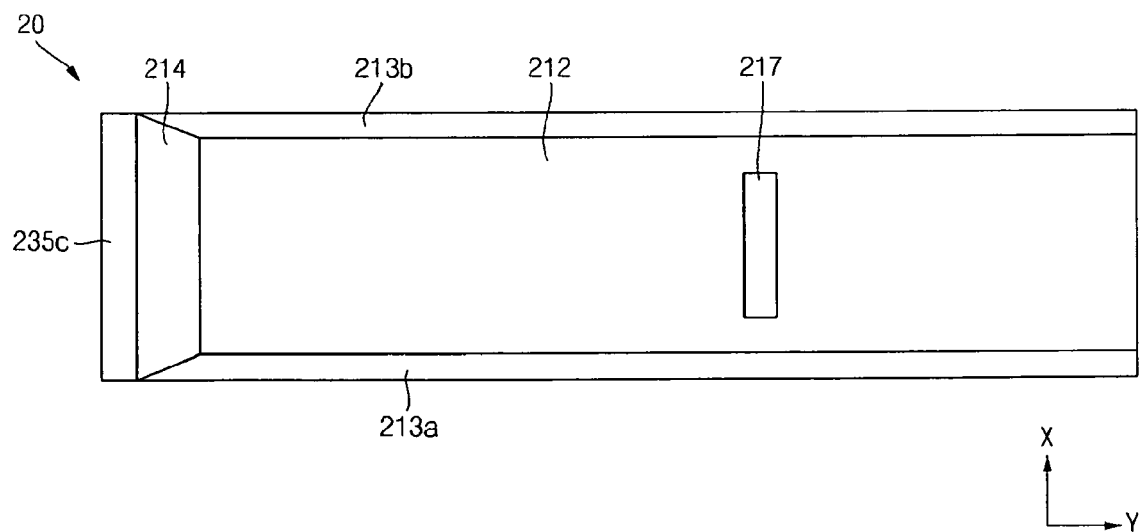

The air guide vane 217 may be disposed at various positions, e.g., according to a position of the inlet 211 defined in the first duct 210 and a thickness of the battery cell 100. For example, FIG. 4b illustrates the air guide vane 217 disposed in a region corresponding to approximately the 10th battery cell 100 from the inlet 211, out of 27 battery cells.

Figure 5:
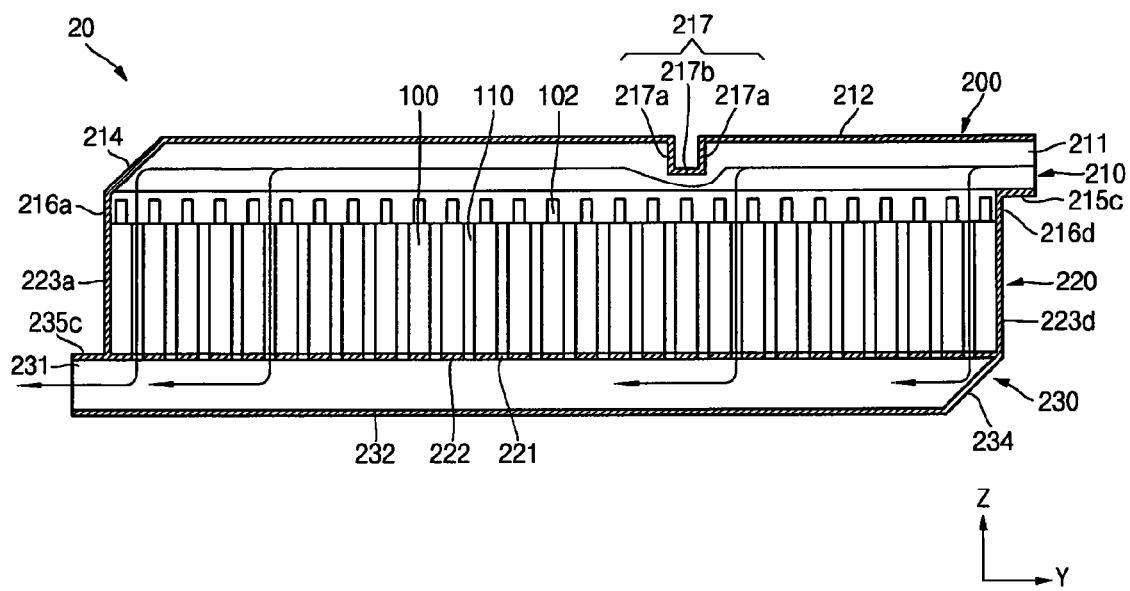
FIG. 5 illustrates an airflow diagram of a battery pack according to the second example embodiment.

FIG. 5 illustrates an airflow diagram of a battery pack according to the second example embodiment.

For the housing 200 without the air guide vane 217, a speed and pressure of air may be relatively slow and low, respectively, in a region adjacent to the inlet 211 of the first duct 210. It is assumed that this is because the inlet 211 of the first duct 210 is disposed above a 1st battery cell 100 (the most right battery cell in FIG. 5). This may result in non-uniform cooling. For example, if the speed and pressure of the air are relatively slow and low, respectively, then approximately the 1st through 5th battery cells may not be effectively cooled. Thus, the 1st through 5th battery cells may have relatively higher temperatures during operation.

For the housing 200 with the air guide vane 217 disposed at a position corresponding to that of approximately 10th battery cell 100, the speed and pressure of the air in the region corresponding to the 10th battery cell 100 may be similar to those of the air in the other regions. Thus, the 1st through 10th battery cells 100 may have temperatures nearly the same as those of the battery cells disposed in the other regions. Thus, according to the present embodiment, a temperature difference between a battery cell 100 adjacent to the inlet 211 and a battery cell 100 adjacent to the outlet 231 may be very small due to the installation of the air guide vane 217.

Figure 6:
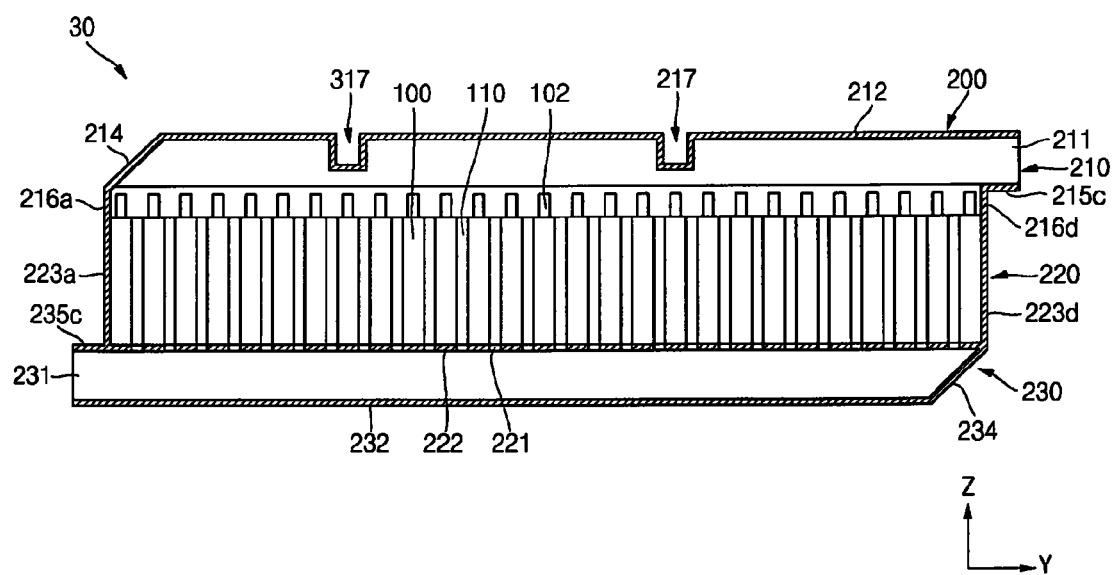
FIG. 6 illustrates an Y-Z sectional view of an air-cooled battery pack according to a third example embodiment.
Figure 7:
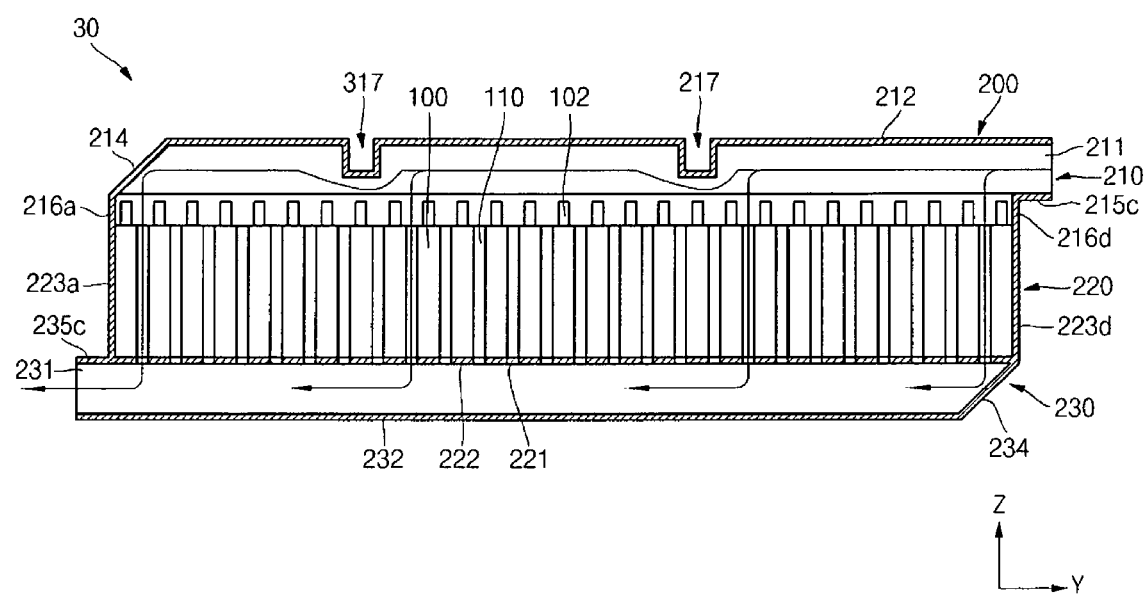
FIG. 7 illustrates an airflow diagram of a battery pack according to the third example embodiment.

FIG. 6 illustrates an Y-Z sectional view of an air-cooled battery pack according to a third example embodiment, and FIG. 7 illustrates an airflow diagram of a battery pack according to the third example embodiment.

Referring to FIGS. 6 and 7, a battery pack 30 according to the third example embodiment may include two or more air guide vanes 217 and 317 on the first duct 210 of the housing 200. Air may be forced to flow downward by the air guide vanes 217 and 317. Thu, the air may be supplied to all battery cells 100 at uniform speed and pressure, and all the battery cells 100 within the housing 200 may have a uniform temperature.

Figure 8:
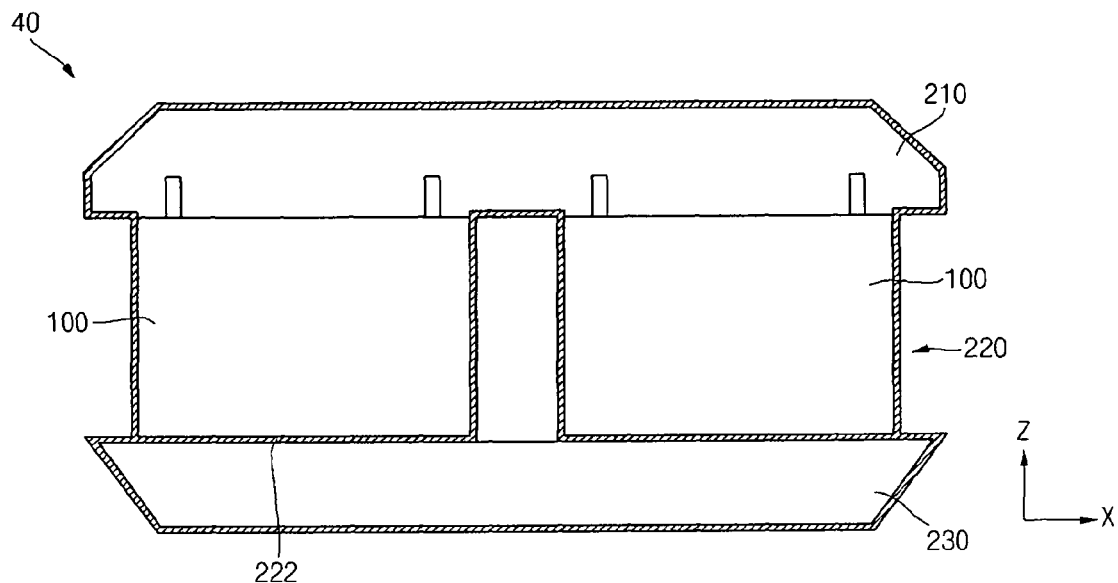
FIG. 8 illustrates an X-Z sectional view of an air-cooled battery pack according to a fourth example embodiment.

FIG. 8 illustrates an X-Z sectional view of an air-cooled battery pack according to a fourth example embodiment.

Referring to FIG. 8, a battery pack 40 according to the fourth example embodiment may include battery cells 100 stacked horizontally in two or more rows. For example, the battery cells 100 may be horizontally stacked on the lower support surface 222 of a main body 220 in two or more rows. A first common duct having a relatively wide region, e.g., duct 210, may be disposed above the main body 220, and a second common duct having a relatively wide region, e.g., duct 230, may be disposed below the main body 220. Air may be supplied through the first common duct 210 to cool the battery cells 100 stacked in two rows and disposed in the main body 220. Furthermore, the air cooling the battery cells 100 may be exhausted to the outside through the second common duct 230.

Figure 9:
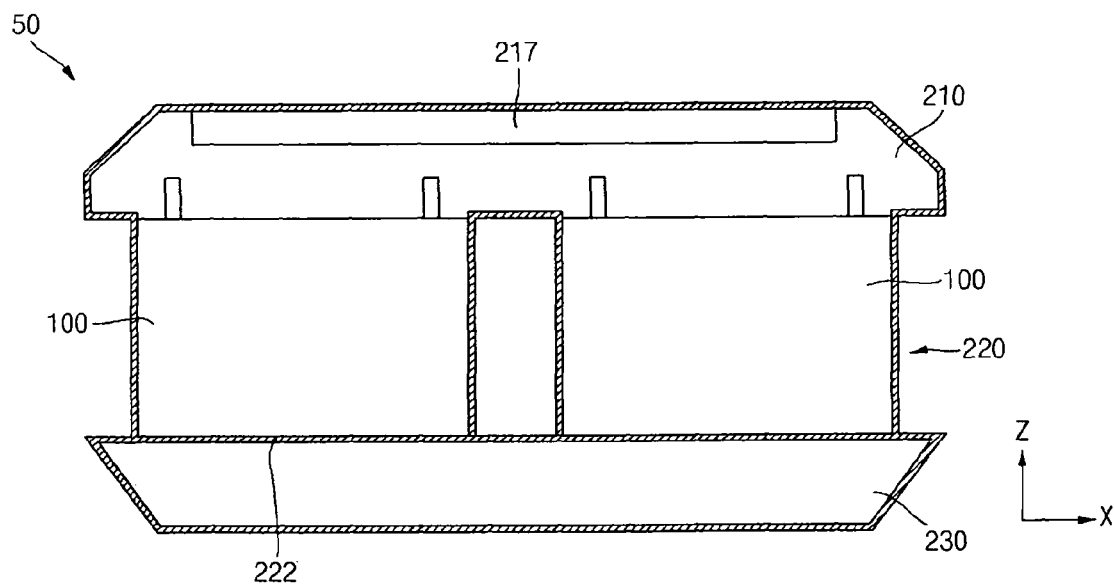
FIG. 9 illustrates an X-Z sectional view of an air-cooled battery pack according to a fifth example embodiment.

FIG. 9 illustrates an X-Z sectional view of an air-cooled battery pack according to a fifth example embodiment.

Referring to FIG. 9, a battery pack 50 according to the fifth example embodiment may include battery cells stacked horizontally in two or more rows. Additionally, the battery pack 50 may include a common air guide vane 217 disposed on the first duct 210. A portion of air supplied through the first duct 210 may be directed downward by the air guide vane 217. Thus, air having a uniform speed and pressure may be supplied to the battery cells stacked horizontally on the lower support surface 222 of the main body 220 in the two or more rows. Thus, battery cells 100 stacked horizontally in two or more rows may have nearly uniform temperatures. Accordingly, a temperature difference between the battery cell 100 adjacent to an inlet and the battery cell 100 adjacent to the outlet may be very small.

A battery pack may include a plurality of chargeable battery cells and a housing that receives the plurality of battery cells. For example, the battery cells may be stacked in a horizontal direction and connected to each other in series. A relatively high current may be applied to or outputted from the battery pack when charged or discharged. Thus, a large amount of heat may occur in each of the battery cells. If the temperature becomes too high, the battery cells may be swelled by expansion of an inner volume thereof. When the battery cells are swelled, an internal resistance may be increased, which may deteriorate electrical performance of the battery cells. Thus, the battery cells may be deteriorated.

Figure 10:
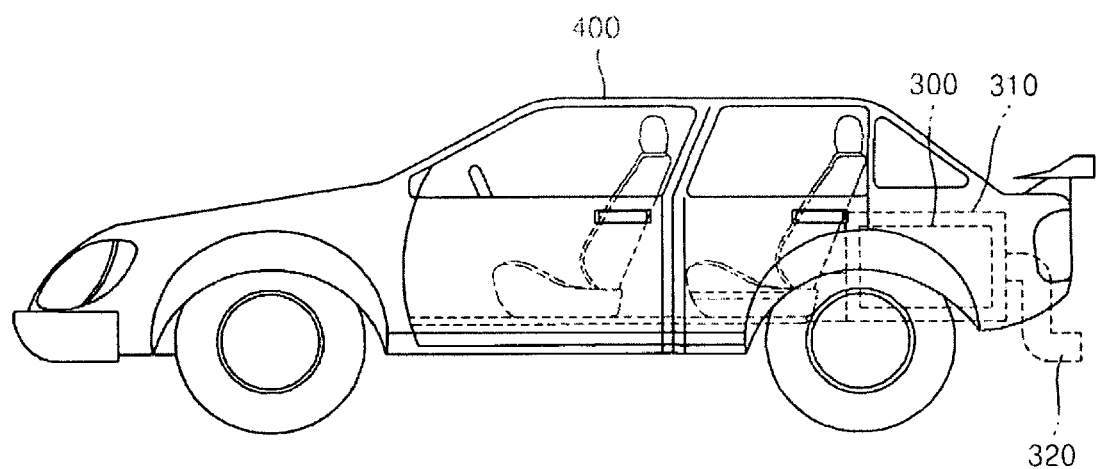
FIG. 10 illustrates a vehicle including an air-cooled battery pack according to a sixth example embodiment.

FIG. 10 illustrates a vehicle 400 including an air-cooled battery pack 300 according to a sixth example embodiment. In an implementation, the vehicle 400 may be an electric vehicle or a hybrid vehicle, e.g., a plug-in electric car, motorcycle, bicycle, scooter, etc., a gas- or diesel-electric hybrid car, motorcycle, bicycle, scooter, etc., and the like, whether carrying passengers or cargo/equipment, and whether human controlled, automated, robotic, etc. The electric vehicle may use an electric engine that is powered by electrical energy output from a battery. The electric vehicle may use a battery pack according to an embodiment to provide power, e.g., as a main power source and/or a backup power source. The hybrid vehicle may use two or more kinds of power sources, for example, an internal combustion engine and an electric motor, to provide motive power. In another implementation, the internal combustion engine may be used only to generate electricity. In another implementation, a fuel cell, e.g., a hydrogen-powered fuel cell, may be used to generate electricity.

In an embodiment, the vehicle 400 may include a power source, the power source providing a motive power for the vehicle, and the battery pack 300 according to an embodiment, the battery pack 300 being configured to provide electricity to the power source. In an implementation, the battery pack 300 may be housed in a case 310. In an implementation, the case 310 may be in addition to the housing 200 described above. In another implementation, the housing 200 described above may serve as the case 310. The case 310 may be coupled with an inlet or outlet 320 to communicate with the ambient atmosphere.

As described above, embodiments may provide an air-cooled battery pack configured to reduce a temperature variation between stacked battery cells. The air-cooled battery pack may provide for reduced temperature variation between stacked battery cells. The air-cooled battery pack may include a plurality of battery cells stacked in a horizontal direction and a housing receiving the plurality of battery cells. The housing may be disposed above the battery cells. The housing may include a first duct supplying air to upper sides of the battery cells, a main body disposed below the first duct to support the plurality of battery cells, the main body supplying the air to lower sides of the battery cells, and a second duct disposed below the main body to exhaust the air to the outside. Embodiments may also provide an air-cooled battery pack configured to improve a strength of a housing.

The air-cooled battery pack according to an embodiment may include a chamfer in a region in which an airflow direction is significantly changed in the first and second ducts. Thus, an air vortex may not occur within the first and second ducts, and air may be supplied to the all battery cells at a uniform speed and pressure. Accordingly, a temperature variation between the battery cells may be reduced. For example, a temperature variation between the battery cells at the inlet and outlet of the battery pack may be reduced.

An air-cooled battery pack according to an embodiment may further include at least one air guide vane by which the airflow direction is switched downward in the first duct. Thus, air may be supplied to all the battery cells at the uniform speed and pressure, and a temperature variation between the battery cells may be further reduced. For example, a temperature variation between battery cells at the inlet and outlet of the battery pack may be further reduced. The air-cooled battery pack according to an embodiment may include at least one air guide vane in the first duct. Thus, the strength of the housing may be improved.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A battery pack, comprising:
first and second battery cells;
a first duct, the first duct having an inlet at a first end and an inclined surface at a second end opposite the first end; and
a main body, the main body being connected to the first duct and encompassing the first and second battery cells, wherein:
the inclined surface has a first edge and a second edge opposite the first edge, the first edge being adjacent to the battery cells, the inclined surface being inclined such that the second edge is closer to the inlet than the first edge is,
a gap is between the first and second battery cells, the gap providing a passage for a heat transfer medium to flow from the first duct between the first and second battery cells,
the first and second battery cells are stacked in a first direction, and
the first duct includes inclined side surfaces, the inclined side surfaces each having a first edge extending in parallel with the first direction and a second edge extending in parallel with the first direction, the first edges being adjacent the battery cells, the inclined side surfaces being inclined towards each other such that the second edges are closer to each other than the first edges are.

2. The battery pack as claimed in claim 1, further comprising a second duct, the second duct having an outlet, wherein the first and second battery cells are between the first duct and the second duct.

3. The battery pack as claimed in claim 1, further comprising a heat sink between the first and second battery cells.

4. The battery pack as claimed in claim 3, wherein the gap is defined by a trench in the heat sink.

5. The battery pack as claimed in claim 1, further comprising a second duct, the second duct having an outlet, wherein:
the first and second battery cells are between the first duct and the second duct,
the second duct has a first end and a second end opposite the first end, the outlet being at the second end, and
the second duct has an inclined surface at the first end, the inclined surface of the second duct having a first edge and a second edge opposite the first edge, the first edge being adjacent to the battery cells, the inclined surface of the second duct being inclined such that the second edge is closer to the outlet than the first edge is.

6. The battery pack as claimed in claim 5, wherein the second duct includes inclined side surfaces, the inclined side surfaces of the second duct each having a first edge extending in the first direction and a second edge extending in the first direction, the first edges being adjacent the battery cells, the inclined side surfaces being inclined towards each other such that the second edges are closer to each other than the first edges are.

7. The battery pack as claimed in claim 6, wherein:
the first duct extends in a horizontal direction, and
the first duct is above the second duct.

8. The battery pack as claimed in claim 5, further comprising a support surface between the main body and one of the first and second ducts, the support surface supporting the first and second battery cells.

9. The battery pack as claimed in claim 8, wherein the support surface includes a hole penetrating therethrough, the hole being aligned with the gap and being configured to allow flow of the heat transfer medium from the gap to the outlet.

10. The battery pack as claimed in claim 1, wherein:
the first duct includes a first surface, the second edge of the inclined surface of the first duct being an edge of the first surface,
the first duct includes an air guide vane extending from the first surface toward the batteries, and
the air guide vane is spaced apart from the batteries such that the heat transfer medium can flow between the batteries and the air guide vane.

11. The battery pack as claimed in claim 10, wherein the first surface is an outer surface of the first duct.

12. The battery pack as claimed in claim 10, wherein the air guide vane has a width less than that of the first surface.

13. The battery pack as claimed in claim 10, wherein the first duct includes a plurality of air guide vanes extending from the first surface toward the batteries.

14. The battery pack as claimed in claim 1, wherein:
the first and second battery cells are included in a first set of battery cells stacked together and extending in the first direction, and
the battery pack includes a second set of battery cells next to the first set, the first duct being in flow communication with each of the first and second sets of battery cells.

15. The battery pack as claimed in claim 14, further comprising:
a second duct, the second duct having an outlet, wherein the first and second battery cells are between the first duct and the second duct; and
a support surface between the main body and one of the first and second ducts, the support surface supporting the first and second battery cells, wherein:
the first duct extends in the first direction, the first direction being horizontal, and
the second duct includes inclined side surfaces, the inclined side surfaces of the second duct each having a first edge extending in the first direction and a second edge extending in the first direction, the first edges being adjacent the battery cells, the inclined side surfaces being inclined towards each other such that the second edges are closer to each other than the first edges are.

16. A vehicle, comprising:
a power source, the power source providing a motive power for the vehicle; and
a battery pack configured to provide electricity to the power source, the battery pack including:
first and second battery cells;
a first duct, the first duct having an inlet at a first end and an inclined surface at a second end opposite the first end; and
a main body, the main body being connected to the first duct and encompassing the first and second battery cells, wherein:
the inclined surface has a first edge and a second edge opposite the first edge, the first edge being adjacent to the battery cells, the inclined surface being inclined such that the second the second edge is closer to the inlet than the first edge is, a gap is between the first and second battery cells, the gap providing a passage for a heat transfer medium to flow from the first duct between the first and second battery cells, the first and second battery cells are stacked in a first direction, and the first duct includes inclined side surfaces, the inclined side surfaces each having a first edge extending in parallel with the first direction and a second edge extending in parallel with the first direction, the first edges being adjacent the battery cells, the inclined side surfaces being inclined towards each other such that the second edges are closer to each other than the first edges are.

17. The vehicle as claimed in claim 16, wherein the battery pack further includes a second duct, the second duct having an outlet, wherein the first and second battery cells are between the first duct and the second duct.

18. The vehicle as claimed in claim 16, wherein the battery pack further includes a heat sink between the first and second battery cells.

19. The vehicle as claimed in claim 18, wherein the gap is defined by a trench in the heat sink.

* * * * *